(12) United States Patent
Gills

(10) Patent No.: US 12,102,573 B2
(45) Date of Patent: Oct. 1, 2024

(54) CREMATION URN

(71) Applicant: Conswayla Gills, Murfreesboro, TN (US)

(72) Inventor: Conswayla Gills, Murfreesboro, TN (US)

( * ) Notice: Subject to any disclaimer, the term of this patent is extended or adjusted under 35 U.S.C. 154(b) by 66 days.

(21) Appl. No.: 17/978,157

(22) Filed: Oct. 31, 2022

(65) Prior Publication Data
US 2024/0143258 A1 May 2, 2024

(51) Int. Cl.
| | | |
|---|---|---|
| *A61G 17/08* | (2006.01) | |
| *G01P 13/00* | (2006.01) | |
| *G06F 3/14* | (2006.01) | |
| *G06F 3/16* | (2006.01) | |
| *H01M 10/42* | (2006.01) | |
| *H01M 10/44* | (2006.01) | |

(52) U.S. Cl.
CPC .............. *A61G 17/08* (2013.01); *G01P 13/00* (2013.01); *G06F 3/14* (2013.01); *G06F 3/165* (2013.01); *H01M 10/425* (2013.01); *H01M 10/44* (2013.01); *H01M 2220/30* (2013.01)

(58) Field of Classification Search
CPC ....... A61G 17/008; E04H 13/008; G06F 3/14; G06F 3/165; G01P 13/00; H01M 10/425; H01M 10/44; H01M 2200/30
See application file for complete search history.

(56) References Cited

U.S. PATENT DOCUMENTS

| | | | |
|---|---|---|---|
| 5,729,921 A * | 3/1998 | Rojas | E04H 13/006 27/1 |
| 5,987,720 A * | 11/1999 | Yamamoto | A61G 17/0136 27/35 |
| 6,414,663 B1 | 7/2002 | Manross, Jr. | |
| 6,980,107 B1 * | 12/2005 | Ziegler | G08B 25/00 540/541 |
| 7,934,299 B2 * | 5/2011 | Holzman | A61G 17/04 40/725 |
| 8,068,035 B1 | 11/2011 | Salcedo | |
| 8,419,140 B2 * | 4/2013 | Ward | A47F 7/283 211/85.27 |
| 9,987,184 B2 * | 6/2018 | Borovinov | H04N 23/00 |
| 10,233,663 B1 * | 3/2019 | Grupp | E04H 13/003 |
| 10,372,162 B1 * | 8/2019 | Beaulieu | G06F 1/1637 |
| 10,458,144 B1 * | 10/2019 | Yearick | H05B 45/10 |
| 11,050,970 B1 * | 6/2021 | Martin | H04N 5/775 |
| 2001/0036354 A1 | 11/2001 | Majors | |
| 2004/0085337 A1* | 5/2004 | Barrows | E04H 13/003 715/717 |

(Continued)

FOREIGN PATENT DOCUMENTS

| | | |
|---|---|---|
| CN | 200966709 | 10/2007 |
| EP | 2050427 | 10/2007 |

*Primary Examiner* — William L Miller

(57) ABSTRACT

A cremation urn for housing cremation remains and displaying video images includes a container for containing cremation remains. A display screen is mounted to a perimeter wall of the container, and a control circuit being electrically coupled to the display screen is programmable with video files to be displayed on the display screen. A motion sensor is also attached to the perimeter wall which activates the control circuit to display video files on the display screen when the motion sensor detects motion within a region in front of the motion sensor.

1 Claim, 4 Drawing Sheets

(56) References Cited

U.S. PATENT DOCUMENTS

| | | | |
|---|---|---|---|
| 2005/0005409 A1* | 1/2005 | Elnatan | A61G 17/08 27/1 |
| 2005/0204300 A1* | 9/2005 | Mindrum | G06Q 10/10 715/764 |
| 2006/0075343 A1* | 4/2006 | Henry | G11B 31/006 715/704 |
| 2006/0236326 A1* | 10/2006 | Aguirre | G06F 1/1635 719/322 |
| 2008/0010792 A1 | 1/2008 | Pryd-Kakuk | |
| 2010/0077580 A1* | 4/2010 | Holzman | A61G 17/04 40/745 |
| 2016/0353188 A1* | 12/2016 | Epps | A61G 17/08 |
| 2017/0041584 A1* | 2/2017 | Jones | H04N 5/76 |
| 2018/0035094 A1* | 2/2018 | Evans | F03D 9/25 |
| 2023/0263692 A1* | 8/2023 | Purdue | A61H 3/04 280/87.021 |
| 2024/0156663 A1* | 5/2024 | Miller | G06F 3/041 |

* cited by examiner

CREMATION URN

BACKGROUND OF THE INVENTION

(1) Field of the Invention

The disclosure relates to cremation urns and more particularly pertains to a new cremation urn for housing cremation remains and displaying video images to memorialize a deceased person.

(2) Description of Related Art Including Information Disclosed Under 37 CFR 1.97 and 1.98

The prior art relates to cremation urns which display images on a screen to memorialize a deceased person.

BRIEF SUMMARY OF THE INVENTION

An embodiment of the disclosure meets the needs presented above by generally comprising a container having a base wall and a perimeter wall being coupled to and extending upwardly from the base wall. The container has an interior space defined therein, and a top side of the container is an opening to the interior space. A display screen is coupled to the container and is positioned on the perimeter wall. The display screen faces outwardly from the container. A control circuit is electrically coupled to the display screen and is programmable with video files to be displayed on the display screen. A motion sensor is coupled to the container and positioned on the perimeter wall. The motion sensor is electrically coupled to the control circuit and is programmed to detect motion within a region in front of the motion sensor. The control circuit activates the display screen to selectively display one or more of the video files when the motion sensor detects motion within the region.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
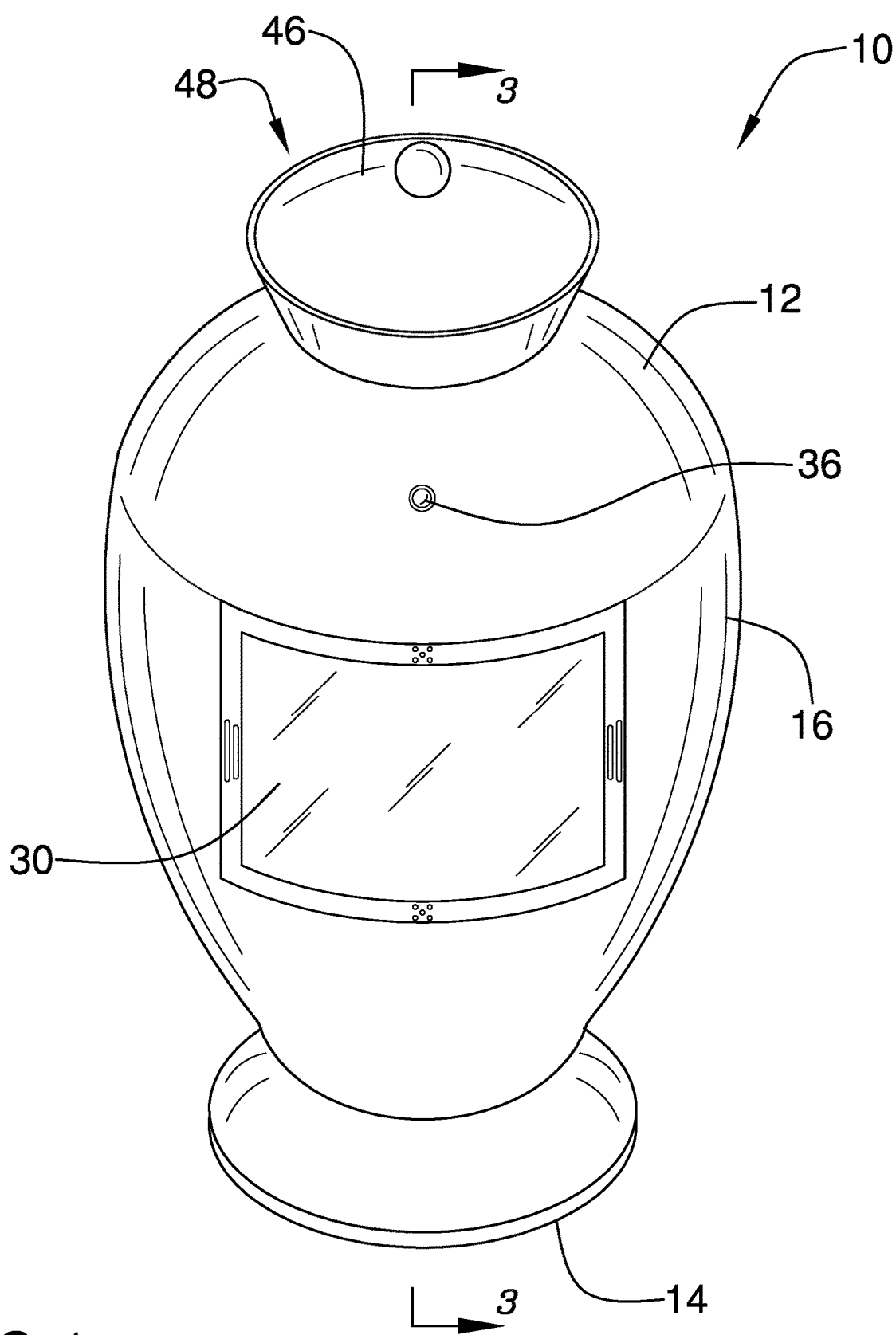
FIG. 1 is a top front perspective view of a cremation urn according to an embodiment of the disclosure.
Figure 2:
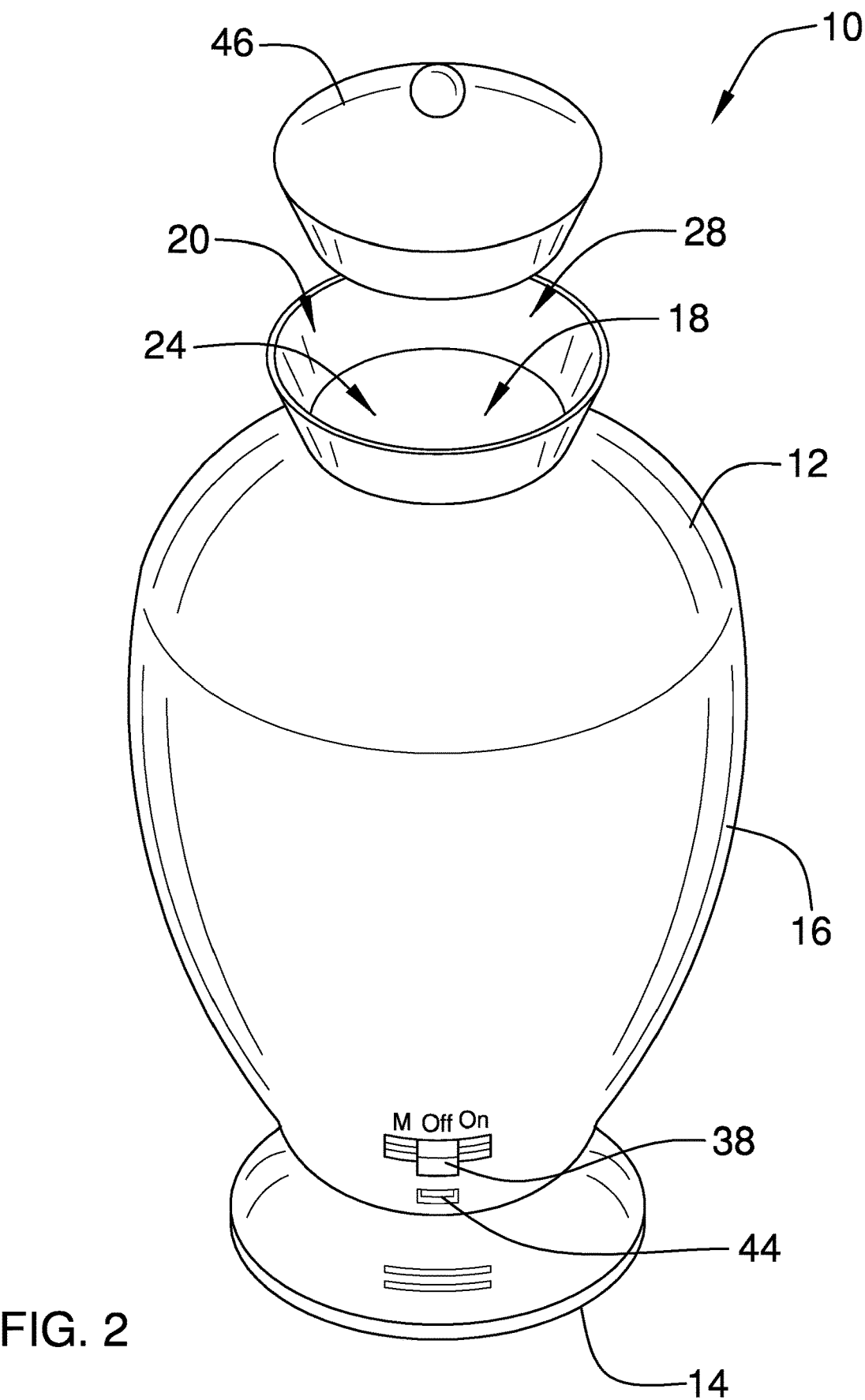
FIG. 2 is a top rear view of an embodiment of the disclosure.
Figure 3:
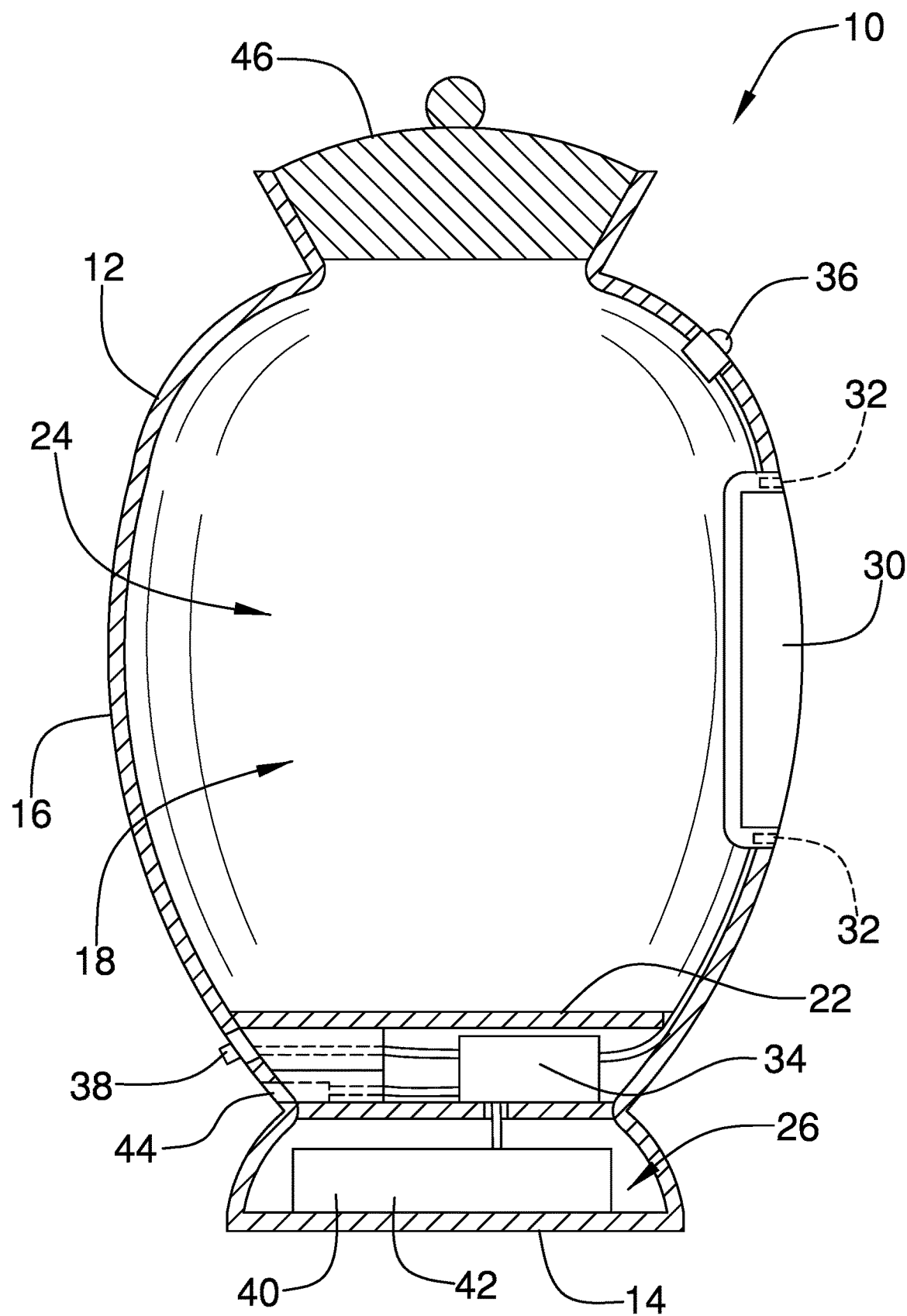
FIG. 3 is a cross-sectional view of an embodiment of the disclosure from arrows 3-3 in FIG. 1.
Figure 4:
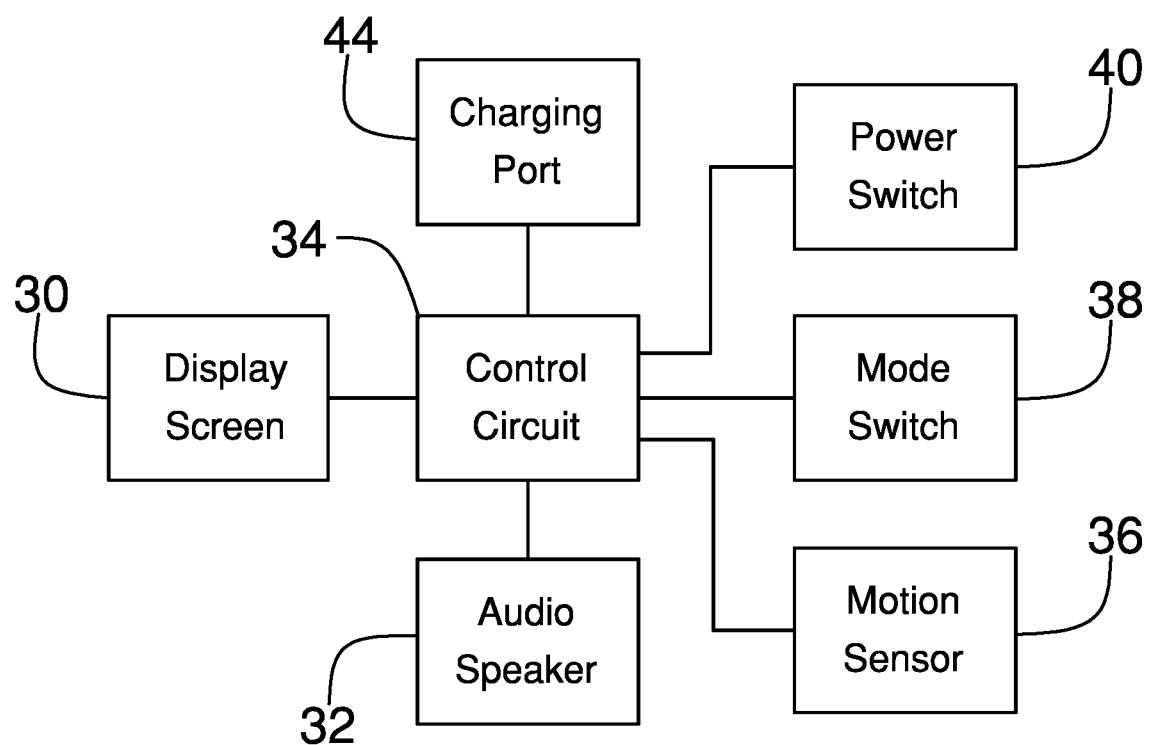
FIG. 4 is a block diagram of an embodiment of the disclosure.

With reference now to the drawings, and in particular to FIGS. 1 through 4 thereof, a new cremation urn embodying the principles and concepts of an embodiment of the disclosure and generally designated by the reference numeral 10 will be described.

As best illustrated in FIGS. 1 through 4, the cremation urn 10 generally comprises a container 12 having a base wall 14 and a perimeter wall 16 being coupled to and extending upwardly from the base wall 14. The container 12 has an interior space 18 defined therein, and a top side 20 of the container 12 is an opening 28 to the interior space 18. A divider wall 22 of the container 12 is positioned in the interior space 18 and divides the interior space 18 into a remains compartment 24 in communication with the opening 28 and a circuitry compartment 26 positioned between the divider wall 22 and the base wall 14.

A display screen 30 is coupled to the container 12. The display screen 30 is positioned on the perimeter wall 16 and faces outwardly from the container 12. An audio speaker 32 is also be coupled to the container 12 and positioned on the perimeter wall 16 for emitting audible sound outwardly away from the container 12. A control circuit 34 is positioned within the circuitry compartment 26 and is electrically coupled to the display screen 30 and the audio speaker 32. The control circuit 34 has a memory which is programmable with video files to be displayed on the display screen 30 and audio files to be played on the audio speaker 32.

A motion sensor 36 is coupled to the container 12 and positioned within the circuitry compartment 26. The motion sensor 36 is also electrically coupled to the control circuit 34 and is programmed to detect motion within a region in front of the motion sensor 36. The control circuit 34 activates the display screen 30 to selectively display one or more of the video files and activates the audio speaker 32 to selectively audibly play one or more of the audio files when the motion sensor 36 detects motion within the region.

A mode switch 38 is coupled to the container 12, positioned on the perimeter wall 16, and electrically coupled to the control circuit 34. The mode switch 38 is operable to select one of a plurality of operation modes, including an always on mode, a motion sensing mode, and an off mode. In the always on mode, the control circuit 34 activates the display screen 30 to selectively display one or more of the video files and activates the audio speaker 32 to selectively audibly play one or more of the audio files. In the motion sensing mode, the control circuit 34 activates the display screen 30 to selectively display one or more of the video files and activates the audio speaker 32 to selectively audibly play one or more of the audio files. And in the off mode, each of the display screen 30 and the audio speaker 32 is inactivated.

A power supply 40 is electrically coupled to the control circuit 34 and may comprise a battery 42. The power supply 40 may be positioned in the circuitry compartment 26. If a battery 42 is included, a charging port 44 may be positioned on the perimeter wall 16 and electrically coupled to the battery 42 to selectively recharge the battery 42. A lid 46 may also be included which is removably positionable in a closed position 48 covering the opening 28. A data transfer port may also be provided for transferring video files and audio files onto the memory of the control circuit 34. The control circuit 34 may also have a transceiver for wirelessly receiving video files and audio files. The control circuit 34 may also be programmed to receive video files and audio files from an external source such as a computer, mobile phone, or other like electronic media source and immediately play them without storing them. Additional input may be used for selecting files to be played, playing sequences of files, volume, and other like presentation options.

In use, cremation remains may be placed into the remains compartment 24. One of the operation modes is selected. If the motion sensor 36 mode is selected, display of video files on the display screen 30 and play of audio files on the audio speaker 32 is actuated by the motion sensor 36 detecting motion within the region. If the always on mode is selected, display of video files and play of audio files is not dependent on the motion sensor 36. And if the off mode is selected, the display screen 30 and audio speaker 32 are inactivated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cremation urn comprising:
   a container having a base wall and a perimeter wall being coupled to and extending upwardly from the base wall, the container having an interior space defined therein, a top side of the container being an opening to the interior space, a divider wall being positioned in the interior space and dividing the interior space into a cremation remains compartment in communication with the opening and a circuitry compartment positioned between the divider wall and the base wall;
   a display screen being coupled to the container and being positioned on the perimeter wall, the display screen facing outwardly from the container;
   an audio speaker being coupled to the container and positioned on the perimeter wall for emitting audible sound outwardly away from the container;
   a control circuit being positioned within the circuitry compartment and being electrically coupled to the display screen and the audio speaker, the control circuit being programmable with audio files to be played on the audio speaker and video files to be displayed on the display screen;
   a motion sensor being coupled to the container and positioned on the perimeter wall, the motion sensor being electrically coupled to the control circuit, the motion sensor being programmed to detect motion within a region in front of the motion sensor, the control circuit activating the display screen to selectively display one or more of the video files and activating the audio speaker to selectively audibly play one or more of the audio files when the motion sensor detects motion within the region;
   a mode switch being positioned on the perimeter wall and being electrically coupled to the control circuit, the mode switch being operable to select one of a plurality of operation modes, the plurality of operation modes comprising:
      an always on mode wherein the control circuit activates the display screen to selectively display one or more of the video files and activates the audio speaker to selectively audibly play one or more of the audio files;
      a motion sensing mode wherein the control circuit activates the display screen to selectively display one or more of the video files and activates the audio speaker to selectively audibly play one or more of the audio files; and
      an off mode wherein each of the display screen and the audio speaker is inactivated;
   a power supply being positioned within the at least one circuitry compartment and being electrically coupled to the control circuit, the power supply being a battery;
   a charging port being positioned on the perimeter wall and being electrically coupled to the battery to selectively recharge the battery; and
   a lid being removably positionable in a closed position covering the opening.

* * * * *